(12) United States Patent
Wang et al.

(10) Patent No.: US 11,615,247 B1
(45) Date of Patent: Mar. 28, 2023

(54) LABELING METHOD AND APPARATUS FOR NAMED ENTITY RECOGNITION OF LEGAL INSTRUMENT

(71) Applicant: ZHEJIANG LAB, Hangzhou (CN)

(72) Inventors: Hongsheng Wang, Hangzhou (CN); Hujun Bao, Hangzhou (CN); Guang Chen, Hangzhou (CN); Chao Ma, Hangzhou (CN); Qing Liao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/830,786

(22) Filed: Jun. 2, 2022

Related U.S. Application Data (63) Continuation of application No. PCT/CN2022/093493, filed on May 18, 2022.

(30) Foreign Application Priority Data

Apr. 24, 2022 (CN) .......................... 202210434737.9

(51) Int. Cl.
*G06F 40/30* (2020.01)
*G06N 3/08* (2023.01)
(Continued)

(52) U.S. Cl.
CPC .......... *G06F 40/295* (2020.01); *G06F 40/242* (2020.01); *G06N 3/047* (2023.01)

(58) Field of Classification Search
CPC .... G06F 40/211; G06F 40/253; G06F 40/268; G06F 40/284; G06F 40/30; G06F 40/295;
(Continued)

(56) References Cited

U.S. PATENT DOCUMENTS

2011/0225155 A1* 9/2011 Roulland ............ G06F 16/3325 707/750
2018/0082197 A1* 3/2018 Aravamudan ......... G16B 50/00
(Continued)

OTHER PUBLICATIONS

Souza et al., title={Portuguese named entity recognition using BERT-CRF}, 2019, journal={arXiv preprintarXiv:1909.10649}, pp. 1-8 (Year: 2019).*

(Continued)

*Primary Examiner* — Lamont M Spooner
(74) *Attorney, Agent, or Firm* — IPro, PLLC (57) ABSTRACT

Disclosed are a labeling method and apparatus for named entity recognition of a legal instrument. The method includes steps: step S1: acquiring a legal text, and transforming the legal text into an index table; step S2: outputting a sentence feature encoding result; step S3: performing training and prediction; step S4: obtaining a set; step S5: obtaining a multi-head score transfer matrix; step S6: obtaining a score transfer matrix corresponding to the legal text; step S7: determining a recognized nested entity; and S8: constructing an entity labeling template by using the recognized nested entity. According to the present disclosure, a user tries to complete recognition of nested entity labeling by changing an input of the BERT model, and a multi-head selection matrix labeling thought of the present disclosure is used to relieve the difficulty in recognizing a long text and a nested entity in an NER task to a larger extent.

9 Claims, 4 Drawing Sheets (51) Int. Cl.
*G06F 40/295* (2020.01)
*G06F 40/242* (2020.01)
*G06N 3/047* (2023.01)

(58) Field of Classification Search
CPC  G06N 3/02; G06N 3/044; G06N 3/08; G06N 3/0895; G06N 3/09; G06N 3/091; G06N 3/092; G06N 3/096; G06N 3/0985
See application file for complete search history.

(56) References Cited

U.S. PATENT DOCUMENTS

| | | | |
|---|---|---|---|
| 2019/0005020 A1* | 1/2019 | Gregory | G06F 18/2411 |
| 2021/0012199 A1* | 1/2021 | Zhang | G06N 3/045 |
| 2021/0183484 A1* | 6/2021 | Shaib | G16H 50/70 |
| 2021/0216715 A1* | 7/2021 | Wang | G06F 40/253 |
| 2021/0224324 A1* | 7/2021 | Fourney | G06F 16/367 |
| 2021/0326534 A1* | 10/2021 | Wang | G06F 16/93 |
| 2022/0121822 A1* | 4/2022 | Zhou | G06N 3/047 |
| 2022/0138492 A1* | 5/2022 | Paulson | G16Y 40/20 |
| | | | 706/12 |
| 2022/0188520 A1* | 6/2022 | Iso-Sipila | G06F 40/295 |
| 2022/0300711 A1* | 9/2022 | Eliseo | G06F 40/12 |
| 2022/0382975 A1* | 12/2022 | Gu | G06F 40/103 |
| 2023/0015606 A1* | 1/2023 | Liu | G06F 40/30 |

OTHER PUBLICATIONS

Li et al., title={A Unified MRC Framework for Named Entity Recognition}, 2019, journal={arXiv preprint arXiv:1910.11476}, pp. 1-11. (Year: 2019).*

Yu e tal., title={Named entity recognition as dependency parsing}, 2020, journal={arXiv preprint arXiv:2005.07150}, pp. 1-7 (Year: 2020).*

Chang, title={Chinese named entity recognition method based on BERT}, 2021, booktitle={2021 IEEE International Conference on Data Science and Computer Application (ICDSCA)},organizational={IEEE}, pp. 294-299 (Year: 2021).*

Yao et al., title={Fine-grained mechanical Chinese named entity recognition based on ALBERT-AttBiLSTM-CRF and transfer learning}, 2020, journal={Symmetry}, volume={12}, publisher={MDPI}, number={12}, pp. 1-21 (Year: 2020).*

* cited by examiner

Fig. 1

Coordinate of an entity in an X-axis direction

Fig. 2

Coordinate of an entity in a Y-axis direction

Fig. 3

|   | 被 | 告 | 人 | 张 | 三 | 酒 | 驾 | 逃 | 逸 | 被 | 拘 | 留 |
|---|---|---|---|---|---|---|---|---|---|---|---|---|
| 被 | 0 | 0 | 0 | 0 | 0 | 0 | 0 | 0 | 0 | 0 | 3 | 0 |
| 告 | 0 | 0 | 0 | 0 | 0 | 0 | 0 | 0 | 0 | 0 | 0 | -1 |
| 人 | 0 | 0 | 0 | 0 | 0 | 0 | 0 | 0 | 0 | 0 | -1 | -1 |
| 张 | 0 | 0 | 0 | 0 | 0 | 2 | 0 | 0 | 0 | -1 | -1 | -1 |
| 三 | 0 | 0 | 0 | 0 | 0 | 0 | 0 | 0 | -1 | -1 | -1 | -1 |
| 酒 | 0 | 0 | 0 | 0 | 0 | 2 | 0 | -1 | -1 | -1 | -1 | -1 |
| 驾 | 0 | 0 | 0 | 0 | 0 | 0 | -1 | -1 | -1 | -1 | -1 | -1 |
| 逃 | 1 | 0 | 0 | 0 | 0 | -1 | -1 | -1 | -1 | -1 | -1 | -1 |
| 逸 | 0 | 0 | 0 | 0 | -1 | -1 | -1 | -1 | -1 | -1 | -1 | -1 |
| 被 | 1 | 0 | 0 | -1 | -1 | -1 | -1 | -1 | -1 | -1 | -1 | -1 |
| 拘 | 0 | 0 | -1 | -1 | -1 | -1 | -1 | -1 | -1 | -1 | -1 | -1 |
| 留 | 0 | -1 | -1 | -1 | -1 | -1 | -1 | -1 | -1 | -1 | -1 | -1 |

LABELING METHOD AND APPARATUS FOR NAMED ENTITY RECOGNITION OF LEGAL INSTRUMENT

CROSS REFERENCE TO RELATED APPLICATION

The present application claims the priority to Chinese Patent Application 20221043473 7.9, titled "LABELING METHOD AND APPARATUS FOR NAMED ENTITY RECOGNITION OF LEGAL INSTRUMENT", filed on Apr. 24, 2022, which is incorporated herein by reference in its entirety.

TECHNICAL FIELD

The present disclosure relates to the technical field of natural language processing, in particular to a labeling method and apparatus for named entity recognition of a legal instrument.

BACKGROUND

In recent years, with the substantial improvement of the computing power of hardware, methods based on deep neural networks have been successfully applied to named entity recognition. The method is an end-to-end method, which can automatically learn and extract text features from large-scale labeled data without special domain resources (such as a dictionary) or construction of ontology.

Current commonly used named entity recognition is divided into a rule-based method and a statistics-based method. In the rule-based method, rules need to be matched; the method depends on dictionaries, templates, and regular expressions; and the method has poor flexibility and poor transportability. In the statistical-based method, named entity recognition is regarded as a classification problem, and the maximum probability is selected; and named entity recognition is regarded as sequence labeling, and hidden Markov, a maximum entropy Markov chain, a conditional random field, a long short-term memory network, and other machine learning sequence labeling models are adopted but they fail to highly recognize nested entities.

SUMMARY

Therefore, a labeling method and apparatus for named entity recognition of a legal instrument are provided to solve the above-mentioned technical problems.

The present disclosure aims to provide a labeling method and apparatus for named entity recognition of a legal instrument to overcome the deficiencies in the prior art.

The technical solutions adopted by the present disclosure are as follows:

A labeling method for named entity recognition of a legal instrument includes the following steps:

step S1: acquiring a legal text; performing, by using a labeling tool, entity labeling on the legal text to obtain labeled information; processing the labeled information to obtain a statement and an annotation; filling, according to an index position, a dictionary made of entities; and storing the statement, the annotation and the dictionary as a file;

step S2: transforming the statement in the file into an index value which can be recognized by a BERT pre-training model, determining an input label information matrix, and creating a generator;

step S3: inputting one batch of index values generated by the generator into the BERT pre-training model to extract sentence context features, capture the sentence context features, understand relationships between sentences, and understand relationships between semantics, and outputting a sentence feature encoding result;

step S4: inputting the sentence feature encoding result into a conditional random field model for training and prediction, and acquiring an entity recognition label sequence, entity label position information and a score transfer matrix;

step S5: inputting the score transfer matrix into a multi-head neural network layer to obtain a plurality of entity recognition label sequences, a plurality of pieces of entity label position information and a plurality of score transfer matrices corresponding to one entity;

step S6: copying and transposing the score transfer matrix to obtain a transposed matrix, and splicing the transposed matrix with its original matrix to obtain a multi-head score transfer matrix;

step S7: inputting the multi-head score transfer matrix into a fully connected layer to obtain a score transfer matrix corresponding to the legal text, thus completing the construction of a BERT-SPAN training model;

step S8: performing a cross-entropy loss function on the score transfer matrix and the label information matrix to solve a loss value; returning the loss value back into the BERT-SPAN training model for training; and continuously adjusting a training result parameter of the BERT-SPAN training model to obtain a recognized nested entity; and step S9: constructing an entity labeling template by using the recognized nested entity.

Further, the step S1 specifically includes the following sub-steps:

step S11: acquiring a legal text; performing, by using a labeling tool, entity labeling on the legal text to obtain labeled information; decomposing the labeled information into a statement and an annotation; and respectively storing the statement and the annotation into a statement list and an annotation list;

step S12: filling, according to an index position, in a dictionary made of entities with the statement list and the annotation list; and step S13: storing the statement list and the annotation list as well as information of the dictionary into a JSON file.

Further, the step S2 specifically includes the following sub-steps:

step S21: judging and processing the statement in the file in the step S1 to obtain a statement with not more than 510 characters;

step S22: directly transforming the statement with not more than 510 characters into an index value through an encoder of the BERT pre-training model;

step S23: reading the file in the step S1, and extracting a label position;

step S24: determining start coordinate of the entity in an X-axis direction;

step S25: determining end coordinate of the entity in a Y-axis direction;

step S26: combining start coordinate of the entity with end coordinate of the entity, and determining a label information matrix;

step S27: determining, by means of setting a batch size, a maximum length of the statements in the same batch; performing backward filling in each list in the label information matrix to the value of the maximum length; and filling in the index value and an all-zero list generated according to a length of the index value to the maximum length likewise; and step S28: determining a returned value as [index value, all-zero list], [entity position information matrix], and creating a generator.

Further, the step S3 specifically includes the following sub-steps:

step S31: inputting one batch of index values generated by the generator into the BERT-SPAN pre-training model for training to obtain a word embedding vector; and step S32: extracting sentence context features, capturing the sentence context features, understanding relationships between sentences and understanding relationships between semantics according to the word embedding vector, and outputting a sentence feature encoding result.

Further, in the step S4, the score transfer matrix represents a relationship between a prediction entity and the plurality of pieces of label information; an activation function is adopted to obtain an output of a maximum score for each entity; and a label with the highest score is a label corresponding to the entity.

Further, in the step S9, a method for constructing the entity labeling template is designed by using a markup language.

The present disclosure further provides a labeling method for named entity recognition of a legal instrument. In the step S9, attributes of the entity labeling template include: a serial number of a labeled entity, an entity type and code, and a name of a recognized entity.

Further, the step S9 includes the following sub-steps:

step S91: constructing a label set by using the recognized nested entity, wherein the label set includes person, plaintiff, defendant, time, place, event, charge, and result;

step S92: constructing a single-entity template according to the label set, constructed X-axis and Y-axis entity labeling positions and a corresponding entity, wherein the single-entity template includes: a single person entity, a single plaintiff entity, a single defendant entity, a single time entity, a single place entity, a single event entity, and a single charge entity;

step S93: extracting, according to the label set, the constructed X-axis and Y-axis entity labeling positions and corresponding nested entities, and constructing a nested-entity template, wherein a plurality of entities are separated by commas, and the nested-entity template includes: a plurality of person entities, a plurality of plaintiff entities, a plurality of defendant entities, a plurality of time entities, a plurality of place entities, a plurality of event entities, and a plurality of charge entities;

step S94: constructing a non-entity template according to the label set, wherein the non-entity template is composed of unrecognized entities or non-entities in the constructed X-axis and Y-axis entity labeling;

Step S95: taking a set of the single-entity template, the nested-entity template and the non-entity template as the entity labeling template.

The present disclosure further provides a labeling apparatus for named entity recognition of a legal instrument, including a memory and one or more processors, wherein the memory stores an executable code; the one or more processors execute the executable code to implement the labeling method for named entity recognition of a legal instrument according to any one of the above embodiments.

The present disclosure further provides a computer-readable storage medium, which stores a program, wherein the program, when executed by a processor, implements the labeling method for named entity recognition of a legal instrument according to any one of the above embodiments.

The present disclosure has the beneficial effects that first, a SPAN mode is used to provide a method for recognizing a long text in a named entity recognition task; and second, a user can try to complete recognition of a nested entity labeling by changing an input of a BERT model. By the use of the SPAN mode of the present disclosure, the difficulty in recognition of a long text and a nested entity in an NER task is solved to a larger extent, which makes a practice for better solving this problem subsequently. Research of the present disclosure is based on a BERT pre-training language model. Specifically, in the present disclosure, a corpus is first processed by a SPAN method; an original ordinary labeling (BMES) method of position information of the corpus is transformed into labeling of the position information; at the same time, an output of BERT is specified; on this basis, a BERT-SPAN model is constructed; a multi-head feedforward neural network is used to process a score transfer matrix to obtain a multi-head score transfer matrix; the multi-head score transfer matrix is copied and transposed to obtain a transposed matrix; the transposed matrix and the original matrix are spliced to obtain a multi-head labeling position transfer matrix; the multi-head score transfer matrix is input into a fully connected layer to obtain an entity labeled position and construct labeled X-axis and Y-axis position coordinates; and an entity labeling template is constructed by using recognized entities and labeled positions. The present disclosure solves low recognition degree of a long text and a nested entity under the BERT model and also provides a solution for the recognition of the nested entity at the same time. Compared with a machine-learning-based named entity recognition method, this model framework is simpler and has higher accuracy.

DETAILED DESCRIPTION

The following description of at least one exemplary embodiment is merely illustrative in nature and is in no way intended to limit the present disclosure and its application or uses. Based on the embodiments in the present disclosure, all other embodiments obtained by those of ordinary skill in the art without doing creative work shall fall within the protection scope of the present disclosure.

Figure 1:
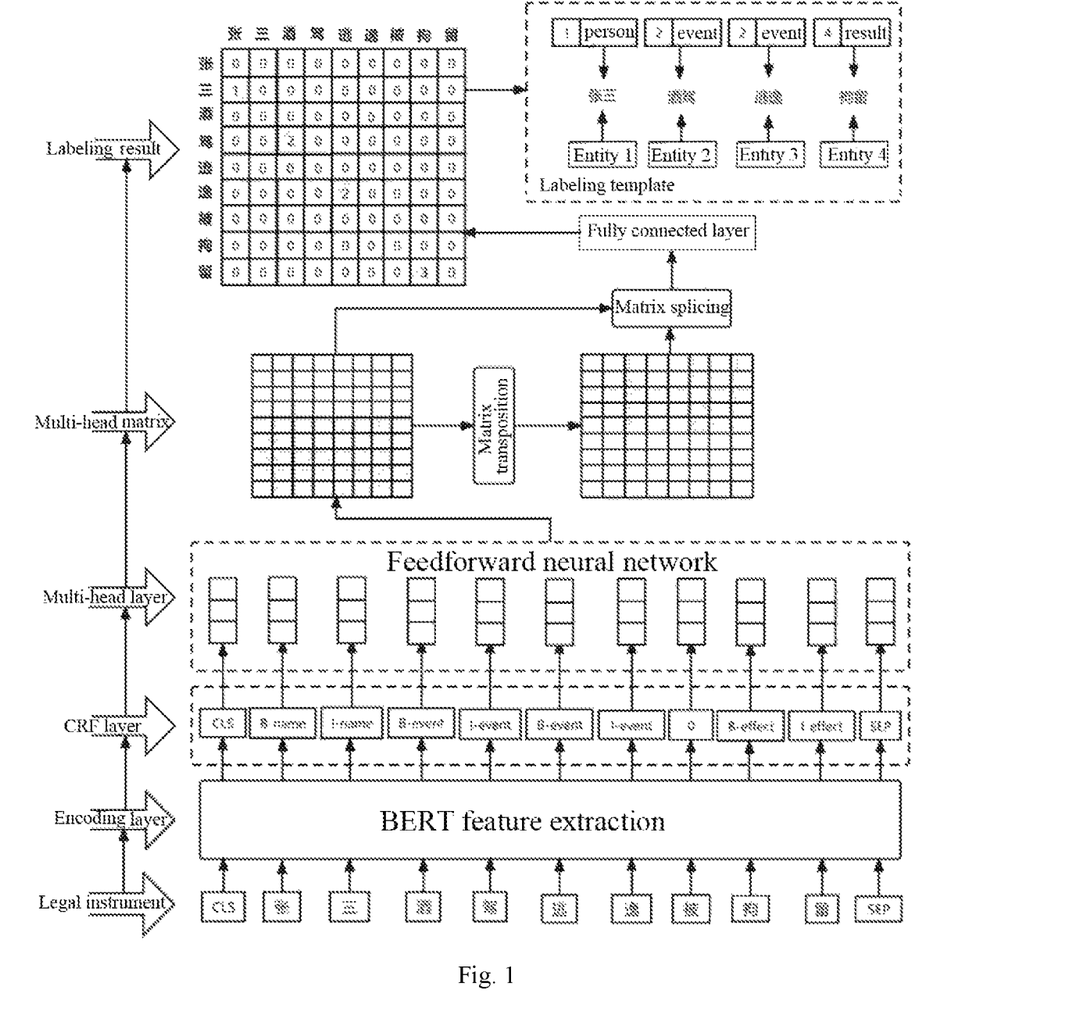
FIG. 1 is an overall architecture diagram of a labeling method for named entity recognition of a legal instrument according to the present disclosure.

As shown in FIG. 1, a labeling method for named entity recognition of a legal instrument includes the following steps:

Step S1: acquiring a legal text; performing, by using a labeling tool, entity labeling on the legal text to obtain labeled information; processing the labeled information to obtain a statement and an annotation; filling, according to an index position, a dictionary made of entities; and storing the statement, the annotation and the dictionary as a file;

step S11: acquiring a legal text; performing, by using a labeling tool, entity labeling on the legal text to obtain labeled information; decomposing the labeled information into a statement and an annotation; and respectively storing the statement and the annotation into a statement list and an annotation list;

step S12: filling, according to an index position, a dictionary made of entities with the statement list and the annotation list; and step S13: storing the statement list and the annotation list as well as information of the dictionary into a JSON file.

Step S2: transforming the statement in the file into an index value which can be recognized by a BERT pre-training model, determining an input label information matrix, and creating a generator;

step S21: judging and processing the statement in the file in the step S1 to obtain a statement with not more than 510 characters;

step S22: directly transforming the statement with not more than 510 characters into an index value through an encoder of the BERT pre-training model;

step S23: reading the file in the step S1, and extracting a label position; wherein for example: "the defendant Zhang San was arrested for driving while intoxicated and hit-and-run". The format of an extracted dictionary is, for example, as follows:

{"serial number of sentence": 0, "sentence length": 12, {"label": {"defendant": [0, 2], [0, 4], "event": [5, 6], [7, 8], "result": [10, 11]}}.

Figure 2:
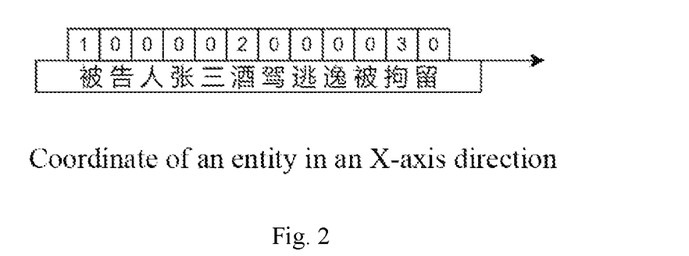
FIG. 2 is an entity coordinate in an X-axis direction of a labeling method for named entity recognition of a legal instrument according to the present disclosure.

Step S24: determining an entity start coordinate in an X-axis direction;

wherein at this moment, a class is transformed into a digit through a label index table, such as the above-mentioned example sentence: {1: [0, 2], [0, 4], 2: [5, 6], [7, 8], 3: [10, 11]}; an all-zero list having the same length as this sentence is created according to the first digit in each list; 0 on the digit positions in the all-zero lists is changed into corresponding label class indexes; if a nested relationship is contained, the digits of two classes are put in the same list, which indicates that this position contains the beginnings of various entities. The whole is expressed as: [1, 0, 0, 1, 0, 2, 0, 0, 0, 0, 3, 0]. This list is used to express position information and labeling information of an entity, so as to construct a coordinate of the entity in the X-axis direction. Each digit represents the beginning of one of the corresponding class entities, referring to FIG. 2.

Figure 3:
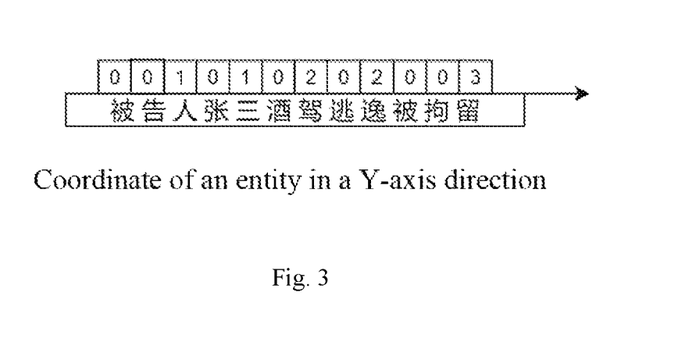
FIG. 3 is an entity coordinate in a Y-axis direction of a labeling method for named entity recognition of a legal instrument according to the present disclosure.

Step S25: determining an entity end coordinate in a Y-axis direction;

wherein 0 on the digit position indexes in another group of all-zero lists with the same length as this sentence is changed into corresponding label class indexes according to the second digit of the entity position list in the above dictionary. The whole is: [0, 0, 1, 0, 1, 0, 2, 0, 2, 0, 0, 3], thus constructing the entity coordinates in the Y-axis direction, and each digit represents the end of one of the corresponding class entities, referring to FIG. 3.

Figure 4:
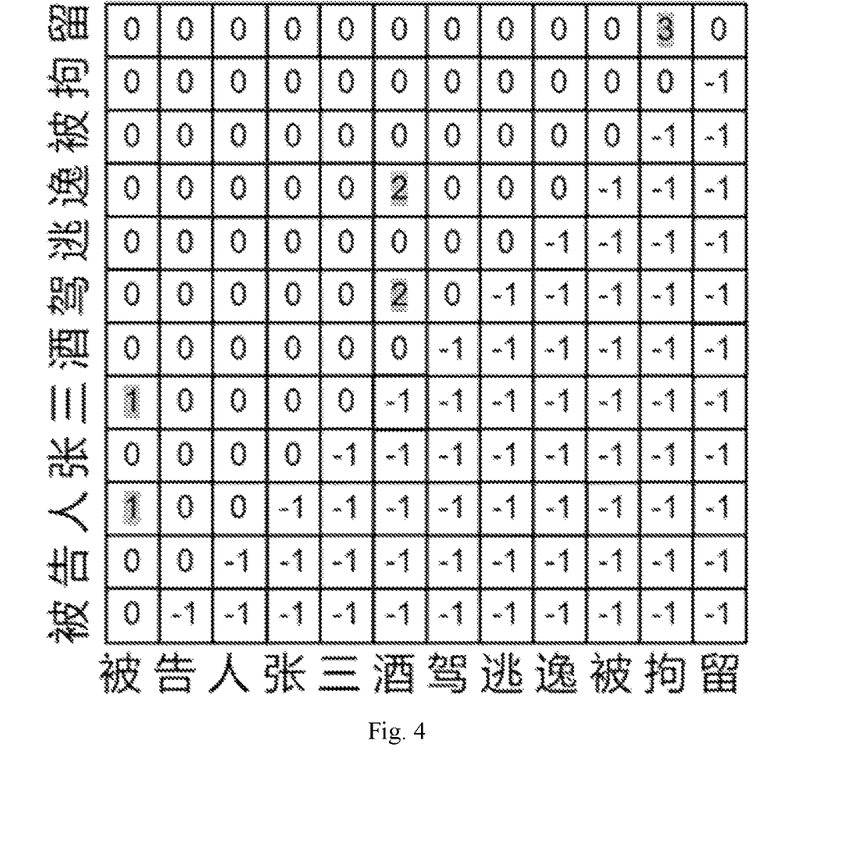
FIG. 4 is an actual matrix of a corpus training process in a labeling method for named entity recognition of a legal instrument according to the present disclosure.
Figure 5:
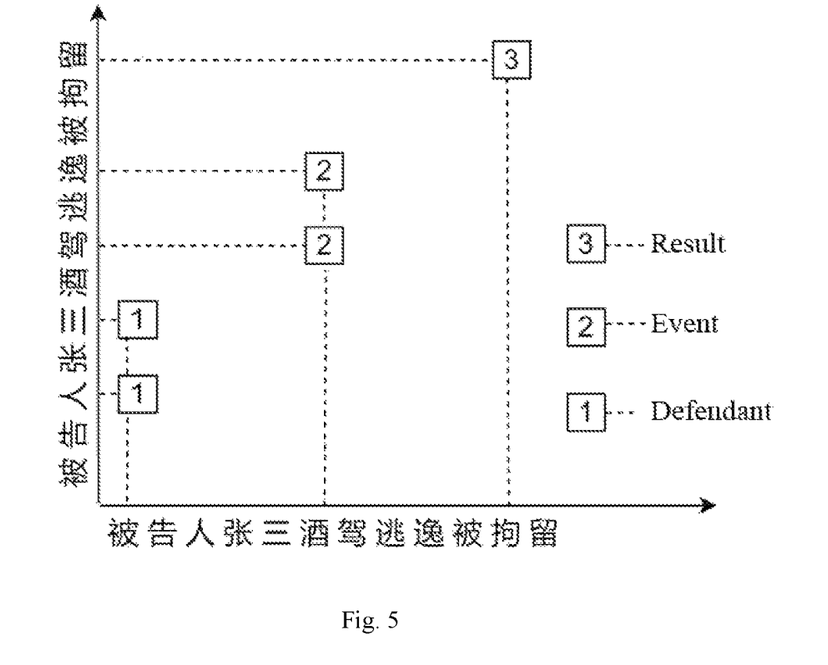
FIG. 5 is a labeling result in a labeling method for named entity recognition of a legal instrument according to the present disclosure.

Step S26: combining the entity start coordinate with the entity end coordinate, and determining a label information matrix; wherein the matrix represents an exact position of each entity in the corpus. A specific representation form is that the X axis and the Y axis have the same text; one point in the matrix is determined according to the X-axis position and the Y-axis position; this point is an entity, and the class of the entity is represented with a corresponding digit. At the same time, in order to avoid over-fitting, a digital, the X-axis of which is greater than the Y-axis is represented by −1, and a digit that is on the upper right part of the matrix and is irrelevant to the position relationship is removed; and this method is used as a template for forming entity position information. The position information of each entity is continuously extracted, and a two-dimensional matrix is constructed to represent the position of the entity in the corpus. An actual matrix in a corpus training process is shown in FIG. 4. A labeling result is as shown in FIG. 5. At the same time, this two-dimensional matrix is input into the model as an entity position information matrix.

Step S27: determining, by means of setting a batch size, a maximum length of the statement in the same batch; performing backward filling on each list in the label information matrix to the value of the maximum length; and filling the index value and an all-zero list generated according to a length of the index value to the maximum length likewise; and step S28: determining a returned value as [index value, all-zero list], [entity position information matrix], and creating a generator.

Step S3: inputting one batch of index values generated by the generator into the BERT pre-training model to extract sentence context features, capture the sentence context features, understand relationships between sentences, and understand relationships between semantics, and outputting a sentence feature encoding result;

step S31: inputting one batch of index values generated by the generator into the BERT-SPAN pre-training model for training to obtain a word embedding vector; and step S32: extracting sentence context features, capturing the sentence context features, understanding relationships between sentences and understanding relationships between semantics according to the word embedding vector, and outputting a sentence feature encoding result.

Step S4: inputting the sentence feature encoding result into a conditional random field model for training and prediction, and acquiring an entity recognition label sequence, entity label position information and a score transfer matrix, wherein the score transfer matrix represents a relationship between a predicted entity and a plurality of pieces of label information; in order to solve the situation that one entity belongs to a plurality of labels, an activation function is adopted to obtain an output of a maximum score for each entity; and the label with the maximum score is a label corresponding to the entity.

Step S5: inputting the score transfer matrix into a multi-head neural network layer to obtain a plurality of entity recognition label sequences, a plurality of pieces of entity label position information and a plurality of score transfer matrices corresponding to one entity;

Step S6: copying and transposing the score transfer matrix to obtain a transposed matrix, splicing the transposed matrix with an original matrix to obtain a multi-head score transfer matrix, and converting the dimension into [batch size, sequence length, sequence length, two hidden layers].

Step S7: inputting the multi-head score transfer matrix into a fully connected layer to obtain a score transfer matrix corresponding to the legal text, and converting the dimension into [batch size, sequence length, sequence length, class position information of a statement in the sequence], thus completing the construction of a BERT-SPAN training model;

step S8: performing a cross-entropy loss function on the score transfer matrix and the label information matrix to solve a loss value; returning the loss value back into the BERT-SPAN training model for training; and continuously adjusting a training result parameter of the BERT-SPAN training model to obtain a recognized nested entity;

wherein the loss is corrected to avoid over-fitting of the BERT-SPAN model. A specific formula for a cross-entropy loss function is as follows:

$$\text{span\_loss} = (1-e)*(-\Sigma_{i=1}^{n} p(xi)\log(q(xi))) + e*(-\Sigma_{i=1}^{n} q(xi)/n \log(q(xi))).$$

wherein span_loss is a loss function used in this model; e is a hyper-parameter which is self-adjustable; n is all predicted information; i is $i^{th}$ predicted information; xi is each class; p(xi) is a true probability distribution; and q(xi) is a predicted probability distribution.

By optimizing parameters batch by batch, positions of real labels are adjusted, and recognized nested entities are determined.

Step S9: constructing an entity labeling template by using the recognized nested entity, wherein a method for constructing the entity labeling template is designed by using a markup language (XML), and attributes of the entity labeling template include: a serial number of a labeled entity, an entity type and code, and a name of a recognized entity.

Step S91: constructing a label set by using the recognized nested entity, wherein the label set includes person, plaintiff, defendant, time, place, event, charge, and result;

step S92: constructing a single-entity template according to the label set, constructed X-axis and Y-axis entity labeling positions and a corresponding entity, wherein the single-entity template includes: a single person entity, a single plaintiff entity, a single defendant entity, a single time entity, a single place entity, a single event entity, and a single charge entity, and the single-entity template is <NER id="1" label="defendant" code="0001">entity</NER>;

step S93: extracting, according to the label set, the constructed X-axis and Y-axis entity labeling positions and corresponding nested entities, and constructing a nested-entity template, wherein a plurality of entities are separated by commas; the nested-entity template includes: a plurality of person entities, a plurality of plaintiff entities, a plurality of defendant entities, a plurality of time entities, a plurality of place entities, a plurality of event entities, and a plurality of charge entities; and the nested-entity template is <NER_MORE id="2" label="event" code="0002">entity 1, entity 2</NER_MORE>;

step S94: constructing a non-entity template according to the label set, wherein the non-entity template is composed of unrecognized entities or non-entities in the constructed X-axis and Y-axis entity labeling, and the non-entity template is <NER_NO id="3" label="NULL" code="NULL">text</NER_NO>;

Step S95: taking a set of the single-entity template, the nested-entity template and the non-entity template as the entity labeling template.

Corresponding to the foregoing embodiment of the labeling method for named entity recognition of a legal instrument, the present disclosure further provides an embodiment of a labeling apparatus for named entity recognition of a legal instrument.

Figure 6:
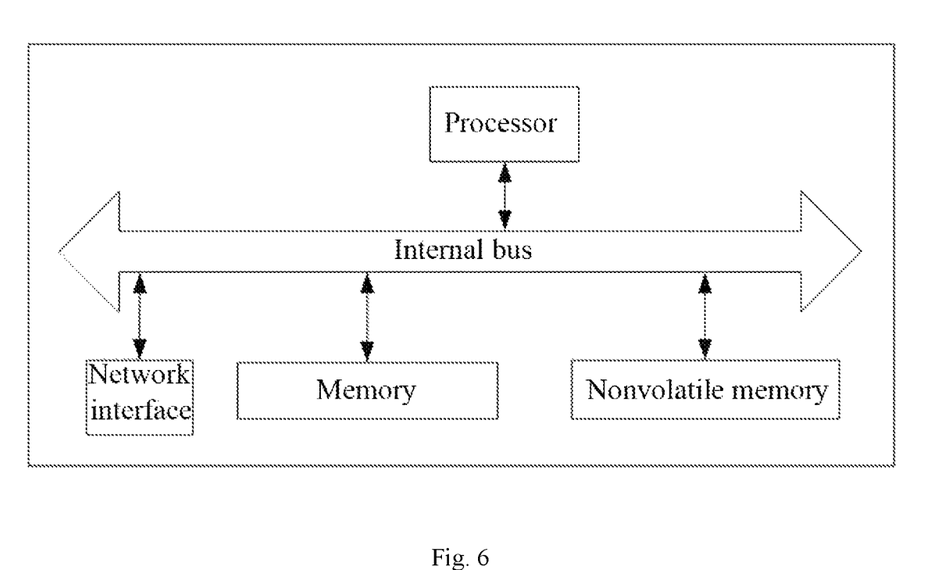
FIG. 6 is a structural diagram of a labeling apparatus for named entity recognition of a legal instrument according to the present disclosure.

Referring to FIG. 6, an embodiment of the present disclosure provides a labeling apparatus for named entity recognition of a legal instrument, including a memory and one or more processors, wherein the memory stores an executable code; the one or more processors execute the executable code to implement the labeling method for named entity recognition of a legal instrument according to any one of the above embodiments.

The embodiment of the labeling apparatus for named entity recognition of a legal instrument of the present disclosure can be applied to any device with data processing capability. The any device with data processing capability may be a device or apparatus such as a computer. The apparatus embodiment may be implemented by software, or may be implemented by hardware or a combination of software and hardware. Implementation by software is taken as an example, an apparatus in a logical sense is formed by reading corresponding computer program instructions in a nonvolatile memory into an internal memory through a processor of any device with the data processing capability where it is located. In terms of hardware, as shown in FIG. 6, a hardware structure diagram of any device with the data processing capability where the labeling apparatus for named entity recognition of a legal instrument of the present disclosure is located is illustrated. In addition to the processor, an internal memory, a network interface, and a nonvolatile memory shown in FIG. 6, any device with the data processing capability where the apparatus in the embodiment is located may also include other hardware usually according to the actual functions of any device with the data processing capability, and repeated descriptions are omitted here.

For details of the implementation process of the functions and effects of all units in the above apparatus, the implementation processes of the corresponding steps in the above method are referred to, and repeated descriptions are omitted here.

For the apparatus embodiment, since it basically corresponds to the method embodiment, reference may be made to the partial description of the method embodiment for related parts. The device embodiments described above are only illustrative, and the units described as separate components may or may not be physically separated, and the components displayed as units may or may not be physical units, that is, they may be located in one place, or may be distributed over multiple network units. Some or all of the modules may be selected according to actual needs to achieve the objectives of the solutions of the present disclosure. Those of ordinary skill in the art can understand and implement it without creative effort.

An embodiment of the present disclosure further provides a computer-readable storage medium, which stores a program, wherein the program, when executed by a processor, implements the labeling method for named entity recognition of a legal instrument in the above embodiment.

The computer-readable storage medium may be an internal storage unit of any device with the data processing capability described in any one of the foregoing embodiments, such as a hard disk or an internal memory. The computer-readable storage medium may also be an external storage device of any device with the data processing capability, such as a plug-in hard disk, a smart media card (SMC), an SD card, and a flash card. Further, the computer-readable storage medium may also include both an internal storage unit and an external storage device of any device with the data processing capability. The computer-readable storage medium is used for storing the computer program and other programs and data required by any device with the data processing capability, and can also be used for temporarily storing data that has been output or will be output.

The above descriptions are only the preferred embodiments of the present disclosure, and are not intended to limit the present disclosure. Any modifications, equivalent replacements or improvements, and the like that are made within the spirit and principle of the present disclosure shall fall within the protection scope of the present disclosure.

What is claimed is:

1. A labeling method for named entity recognition of a legal instrument, comprising the following steps:
    step S1: acquiring a legal text; performing, by using a labeling tool, entity labeling on the legal text to obtain labeled information; processing the labeled information to obtain a statement and an annotation; filling, according to an index position, a dictionary made of entities; and storing the statement, the annotation and the dictionary as a file;
    step S2: transforming the statement in the file into an index value which can be recognized by a BERT pre-training model, determining an input label information matrix, and creating a generator; wherein the step S2 specifically comprises the following sub-steps:
    step S21: judging and processing the statement in the file in the step S1 to obtain a statement with not more than 510 characters;
    step S22: directly transforming the statement with not more than 510 characters into an index value through an encoder of the BERT pre-training model;
    step S23: reading the file in the step S1, and extracting a label position;
    step S24: determining an entity start coordinate in an X-axis direction;
    step S25: determining an entity end coordinate in a Y-axis direction;
    step S26: combining the entity start coordinate with the entity end coordinate, and determining a label information matrix;
    step S27: determining, by means of setting a batch size, a maximum length of the statement in the same batch; performing backward filling on each list in the label information matrix to the value of the maximum length; and filling the index value and an all-zero list generated according to a length of the index value to the maximum length likewise; and
    step S28: determining a returned value as [index value, all-zero list], [entity position information matrix], and creating a generator;
    step S3: inputting one batch of index values generated by the generator into the BERT pre-training model to extract sentence context features, capture the sentence context features, understand relationships between sentences, and understand relationships between semantics, and outputting a sentence feature encoding result;
    step S4: inputting the sentence feature encoding result into a conditional random field model for training and prediction, and acquiring an entity recognition label sequence, entity label position information and a score transfer matrix;
    step S5: inputting the score transfer matrix into a multi-head neural network layer to obtain a plurality of entity recognition label sequences, a plurality of pieces of entity label position information and a plurality of score transfer matrices corresponding to one entity;
    step S6: copying and transposing the score transfer matrix to obtain a transposed matrix, and splicing the transposed matrix with an original matrix to obtain a multi-head score transfer matrix;
    step S7: inputting the multi-head score transfer matrix into a fully connected layer to obtain a score transfer matrix corresponding to the legal text, thus completing the construction of a BERT-SPAN training model;
    step S8: performing a cross-entropy loss function on the score transfer matrix and the label information matrix to solve a loss value; returning the loss value back into the BERT-SPAN training model for training; and continuously adjusting a training result parameter of the BERT-SPAN training model to obtain a recognized nested entity; and
    step S9: constructing an entity labeling template by using the recognized nested entity.

2. The labeling method for named entity recognition of a legal instrument according to claim 1, wherein the step S1 specifically comprises the following sub-steps:
    step S11: acquiring a legal text; performing, by using a labeling tool, entity labeling on the legal text to obtain labeled information; decomposing the labeled information into a statement and an annotation; and storing the statement and the annotation into a statement list and an annotation list respectively;
    step S12: filling, according to an index position, a dictionary made of entities with the statement list and the annotation list; and
    step S13: storing the statement list and the annotation list as well as information of the dictionary into a JSON file.

3. The labeling method for named entity recognition of a legal instrument according to claim 1, wherein the step S3 specifically comprises the following sub-steps:
    step S31: inputting one batch of index values generated by the generator into the BERT-SPAN pre-training model for training to obtain a word embedding vector; and
    step S32: extracting sentence context features, capturing the sentence context features, understanding relationships between sentences and understanding relationships between semantics according to the word embedding vector, and outputting a sentence feature encoding result.

4. The labeling method for named entity recognition of a legal instrument according to claim 1, wherein in the step S4, the score transfer matrix represents a relationship between a prediction entity and the plurality of pieces of label information; an activation function is adopted to obtain an output of a maximum score for each entity; and a label with the highest score is a label corresponding to the entity.

5. The labeling method for named entity recognition of a legal instrument according to claim 1, wherein in the step S9, a method for constructing the entity labeling template is designed by using a markup language.

6. The labeling method for named entity recognition of a legal instrument according to claim 1, wherein in the step S9, attributes of the entity labeling template comprise: a serial number of a labeled entity, an entity type and code, and a name of a recognized entity.

7. The labeling method for named entity recognition of a legal instrument according to claim 1, wherein the step S9 comprises the following sub-steps:
    step S91: constructing a label set by using the recognized nested entity, wherein the label set comprises person, plaintiff, defendant, time, place, event, charge, and result;

step S92: constructing a single-entity template according to the label set, constructed X-axis and Y-axis entity labeling positions and a corresponding entity, wherein the single-entity template comprises: a single person entity, a single plaintiff entity, a single defendant entity, a single time entity, a single place entity, a single event entity, and a single charge entity;

step S93: extracting, according to the label set, the constructed X-axis and Y-axis entity labeling positions and corresponding nested entities, and constructing a nested-entity template, wherein a plurality of entities are separated by commas, and the nested-entity template comprises: a plurality of person entities, a plurality of plaintiff entities, a plurality of defendant entities, a plurality of time entities, a plurality of place entities, a plurality of event entities, and a plurality of charge entities;

step S94: constructing a non-entity template according to the label set, wherein the non-entity template is composed of unrecognized entities or non-entities in the constructed X-axis and Y-axis entity labeling;

Step S95: taking a set of the single-entity template, the nested-entity template and the non-entity template as the entity labeling template.

8. A labeling apparatus for named entity recognition of a legal instrument, comprising a memory and one or more processors, wherein the memory stores an executable code; the one or more processors execute the executable code to implement the labeling method for named entity recognition of a legal instrument according to claim 1.

9. A non-transitory computer-readable storage medium, which stores a program, wherein the program, when executed by a processor, implements the labeling method for named entity recognition of a legal instrument according to claim 1.

* * * * *